United States Patent [19]

Gyi et al.

[11] Patent Number: 4,487,649
[45] Date of Patent: Dec. 11, 1984

[54] APPARATUS AND METHOD FOR ASSEMBLING COMPONENT PARTS

[75] Inventors: Ko Ko Gyi, Thousand Oaks; Gurbachan S. Grewal, Sepulveda, both of Calif.

[73] Assignee: Magnetic Information Technology, Inc., Chatsworth, Calif.

[21] Appl. No.: 421,892

[22] Filed: Sep. 23, 1982

[51] Int. Cl.³ .................... B29C 19/00; B32B 31/00
[52] U.S. Cl. ........................... 156/293; 29/466; 29/467; 29/603; 156/295; 156/556
[58] Field of Search .............. 29/603, 466, 467; 156/293, 295, 556

[56] References Cited

U.S. PATENT DOCUMENTS

| | | | |
|---|---|---|---|
| 4,139,876 | 2/1979 | Owens | 360/97 |
| 4,170,146 | 10/1979 | Owens | 74/89.2 |

Primary Examiner—Jay H. Woo
Assistant Examiner—Timothy W. Heitbrink
Attorney, Agent, or Firm—Evanns & Walsh

[57] ABSTRACT

Tooling and method for assembling parts of a component of a drive apparatus for disc records. A fixture is provided having a cavity for holding a carrier member or button for a magnetic slider head. The slider head is held in an opening in the button while in the fixture, the fixture establishing a predetermined relationship between the button and the slider head. A holding plate is provided with means for holding the parts in the fixture. The method includes the steps of providing the fixture, placing the slider head in the opening in the button, placing these parts in the fixture and holding them in predetermined relationship; applying bonding material to the slider head and the opening; holding the parts in the said relationship for a period of time, while the bonding material cures.

13 Claims, 6 Drawing Figures

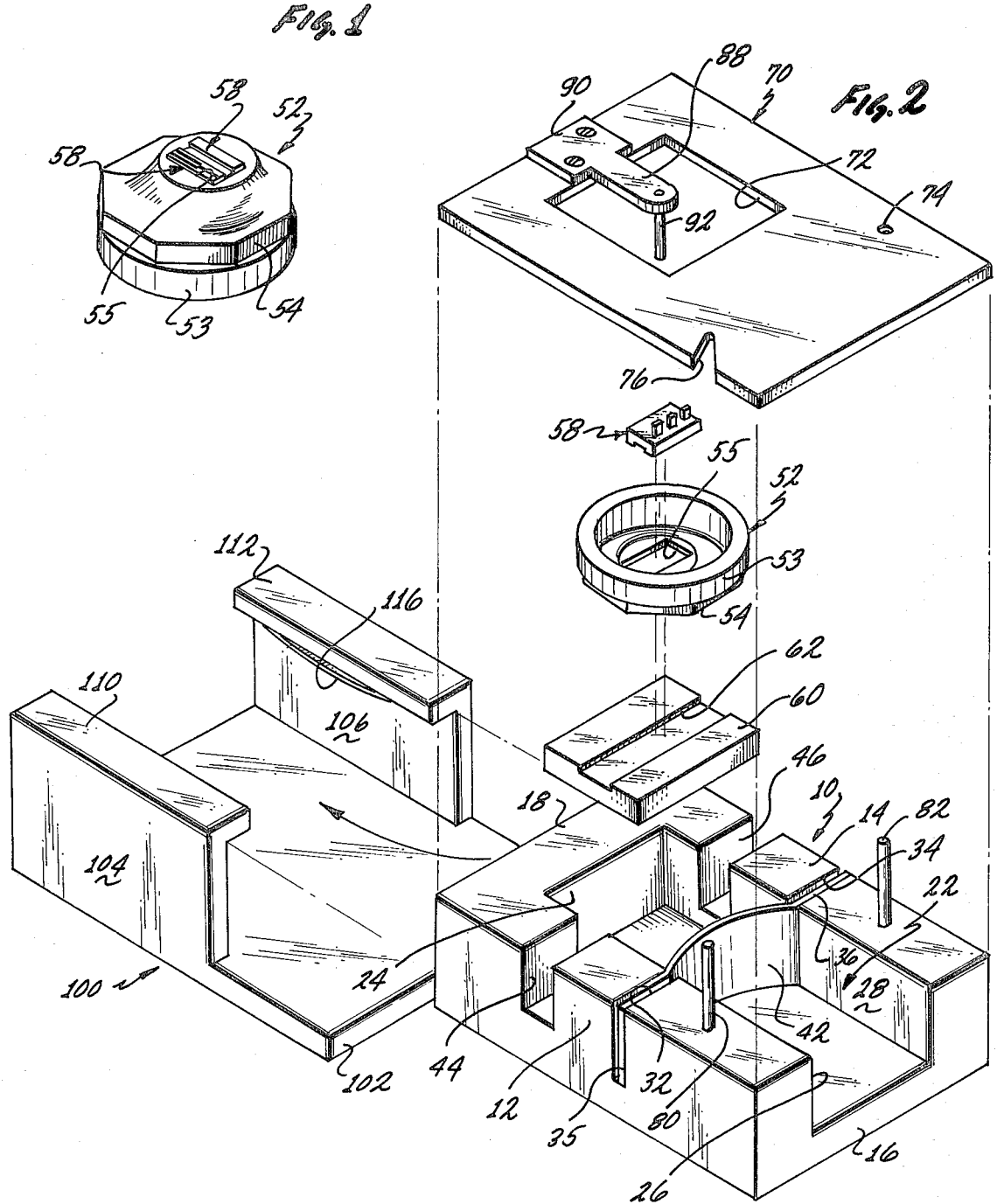

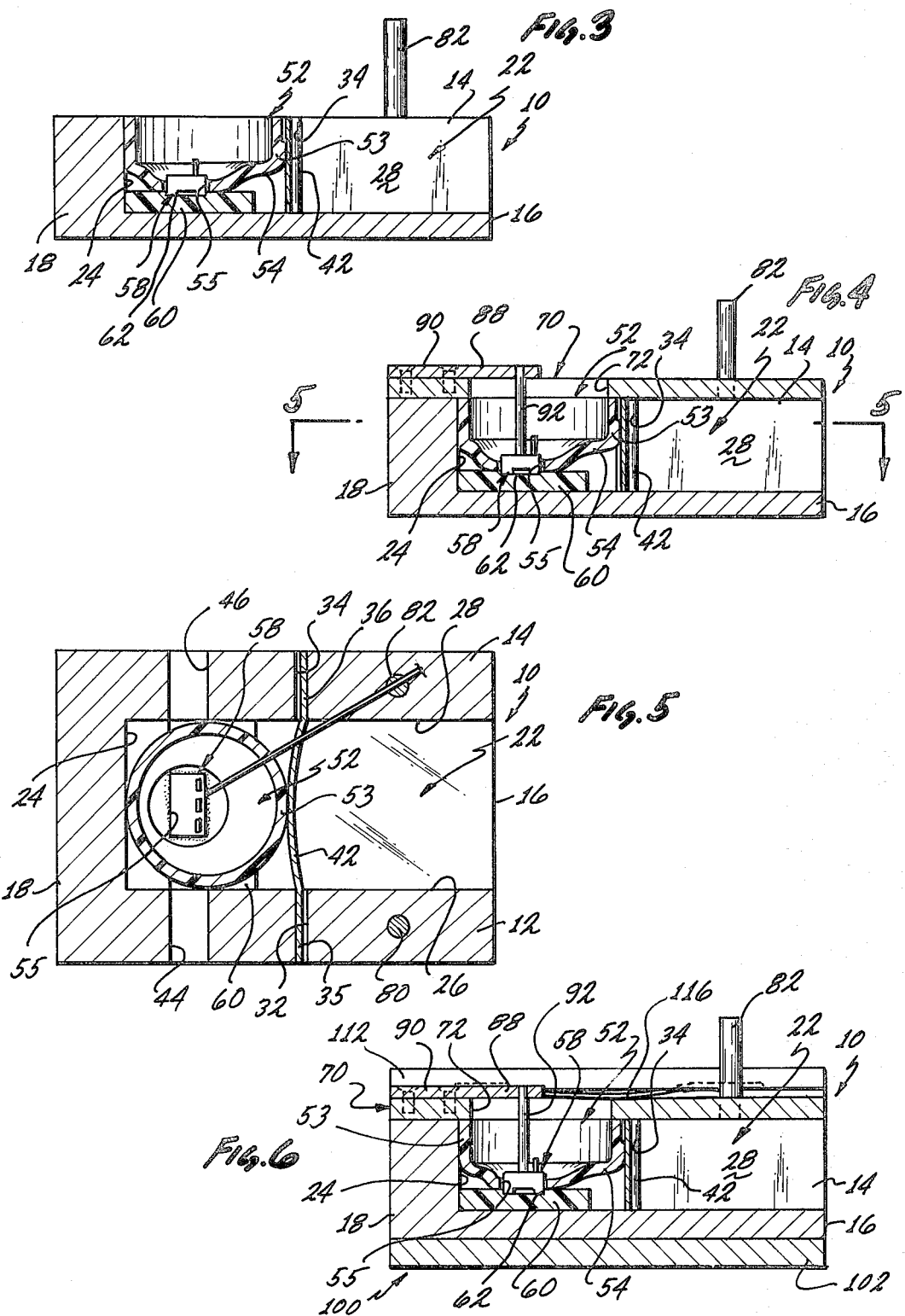

APPARATUS AND METHOD FOR ASSEMBLING COMPONENT PARTS

BACKGROUND OF THE INVENTION

1. Field of the Invention

The field of the invention is that of components of disc record drive and pick-up mechanisms used in magnetic information storage equipment particularly adapted for use in mini and micro computers, and more especially to apparatus and method for the assembly of components. The invention is especially concerned with assembly of a magnetic slider member in a carrier member or button.

2. Description of the Prior Art

U.S. Pat. Nos. 4,139,876 and 4,170,146 disclose improvements in record drive mechanisms particularly adapted for use with disc records which may be utilized for recording and reading out digital information. Equipment of this type includes various components and subcomponents. Typically the equipment utilizes a carrier member, typically in the form of a button which carries a magnetic slider head which comes in contact with the record which carries the information that has been recorded.

The magnetic slider head has to be assembled in the carrier member or button with precision in order to assure that operating results will be as intended. As will be understood in operation, normally the button carrying the magnetic slider head is moved accurately by a stepper motor relative to the record so so that the magnetic slider head is moved with precision. It must be assembled to the button with precision with the slider head protruding from the surface of the button in an accurate predetermined amount.

Assembling the magnetic slider head in the button by hand is tedious, awkward, and time consuming, such that costs of fabrication and production may be prohibitively increased. Tooling such as, for example, fixtures have not been available in the past for the purposes of facilitating the assembly of these parts whereby economy in the fabrication or production of the component or subcomponent could be realized. The herein invention provides apparatus and method for fabricating, that is, assembly whereby the draw-backs associated with the prior art are overcome and the objects and advantages set forth hereinafter are realized.

SUMMARY OF THE INVENTION

In a preferred form of the invention tooling is provided preferably by way of a fixture or fixtures and a method of assembling a magnetic slider head in a carrier button whereby the desired results are realized.

As indicated in the foregoing, the carrier member or button carrying the magnetic slider head is a component or sub-component adapted for use in record drive equipment adapted for use with disc records.

Typically, the carrier member or button is circular with an opening in the top to receive the magnetic slider head. In a preferred form of the invention a fixture is provided having a cavity and a spring member for holding and positioning the carrier button in an inverted position. At the bottom of the fixture is provided an accurately formed insert, preferably formed of Delrin with a recess configured to receive the magnetic slider head while in position in the opening in the button. A holding plate is provided which fits over the fixture to hold the button in position. Additionally, the holding plate has a flexible member which comes into a position to hold the magnetic slider head in position in the button. An opening is provided in the holding plate to facilitate the application of epoxy around the edges of the magnetic slider head for bonding it.

After the steps of preparing the fixture, positioning the button and magnetic slider head, applying bonding material, and applying the holding plate in the method of assembly have been done, the fixture with the parts in position as described and with the holding plate in position is inserted into a secondary fixture which retains the holding plate in position while the epoxy is curing and is bonding the magnetic slider head accurately in position in the button.

In the light of the foregoing, the primary object of the invention is to make available improved tooling in the form of a fixture or fixtures, and method adapted for the assembly or fabrication of a magnetic slider head in a carrier member or button. More broadly speaking, the object of the invention is to provide improvements in apparatus and methods for the assembly and/or fabrication of components or subcomponents of record drive equipment.

A further object is to realize improvements as in the foregoing including a fixture having a cavity arranged to accurately hold a carrier member or button for a magnetic slider head in position with the magnetic slider head inserted into an opening in the button, the fixture having an insert for accurately predetermining the amount of protrusion of the magnetic slider head from the button.

A further object is to provide an improved method for assembling a magnetic slider head in an opening in a carrier member or button including the steps of holding the button in an inverted position; inserting the slider head into an opening in the button while it is being held; predetermining the amount of extension or protrusion of the slider head from the button; applying bonding material to the slider head and the opening; providing a holding a plate for holding the parts in position; and holding the parts in assembled relationship while allowing the bonding material to cure.

Further objects and additional advantages of the invention will become apparent from the following detailed description and annexed drawings.

BRIEF DESCRIPTION OF THE DRAWINGS

FIG. 1 is an isometric view of a carrier member in the form of a button having the magnetic slider head mounted in it;

FIG. 2 is an exploded view of the parts of the fixture utilized for assembling the carrier member and the magnetic slider head along with an additional part or auxiliary fixture for holding the parts together while the epoxy joining the magnetic slider head to the button cures;

FIG. 3 is a sectional view of the fixture of FIG. 2 showing the carrier member and the magnetic slider head and the insert in position in the fixture;

FIG. 4 is a view similar to FIG. 3 further showing the holding means for the magnetic slider head;

FIG. 5 is a sectional view taken along the line 5—5 of FIG. 4 and illustrating the application of the epoxy material for bonding;

FIG. 6 is a sectional view similar to that of FIGS. 3 and 4, but with the top holding plate in position and with the fixture positioned in the auxiliary retaining fixture.

DESCRIPTION OF A PREFERRED EMBODIMENT AND BEST MODE OF PRACTICE

Referring more particularly to FIG. 2 of the drawings numeral 10 designates the fixture or fixture base. It is of rectilinear construction having sides as designated at 12 and 14 and having ends 16 and 18. Formed in the fixture is a rectangular cavity 22 which has an end 24 and which is open at the other end and which has sides 26 and 28.

At an intermediate position in the sides 12 and 14 are formed vertical slots 32 and 34. These slots are provided to receive the ends 35 and 36 of a bow spring 42 which extends between the sides of the fixture as shown.

Adjacent to one end of the fixture formed in its sides 12 and 14 are slots or cutouts 44 and 46.

The part of the cavity 22 between the spring member 42 and the end wall 24 is configured to receive the carrier member, that is, the button which carries the magnetic slider head.

A typical form of button is identified by the numeral 52. It may be a standard commercial article made of appropriate material such as plastic. See FIG. 1. As shown, it has a cylindrical bottom part 53 and an octagonal part 54. The part 54 has a tappered top and it has in it a rectangular opening 55 of a size which can loosely receive the magnetic slider head 58. The magnetic slider head is of conventional construction and may be of a type as described more in detail in prior patents already referred to.

Numeral 60 designates an insert, preferably made of Delrin of rectangular shape as shown. It is shaped to fit down into the bottom of the cavity 22 between the spring 42 and the end wall 24, as may be seen in FIGS. 3, 4, and 6. The insert 60 has a recess 62 in its top surface of an accurate predetermined depth and is shaped to receive the magnetic slider head 58, as will be described.

Numeral 70 designates a rectangular fixture top plate having a square opening 72 in it. The top plate 70 has a hole 74 in it and a V notch 76 on one side. The side 12 of the fixture 10 has an upstanding pin 80 and the side 14 has an upstanding pin 82. When the plate 70 is in the holding position on the fixture as may be seen in FIG. 6 the pin 82 extends through the hole 74 and the pin 80 fits in the V slot 76.

Numeral 88 designates a flexible blade or leaf spring having an enlarged end part 90 which is secured by screws to the plate 70. The leaf spring 88 carries the stem 92 which extends downwardly through the hole 72 and it can extend downwardly to hold the magnetic slider head 58 in position as will be described.

Numeral 100 designates an auxiliary retaining fixture, the purpose of which is to retain the holding plate 70 in position on the fixture 10 while the parts are held in assembled relationship as will be described, during curing of the epoxy which holds the parts together. The auxiliary fixture or device has a flat base 102 and upstanding side walls 104 and 106. Side wall 104 has inwardly extending part or overhang 110 and the side wall 106 has a similar inwardly extending part or overhang 112. Underneath the overhang 112 and attached to it is the bow spring 116, the overhang 110 having a similar bow spring carried by it.

As will be understood, fixture 10 with the holding plate 70 in position can be slid into the auxiliary fixture 100, that is, telescoped into it with the bow springs like the spring 116 coming into position against the top surface of the holding plate 70 to hold it in position as will be described.

Next will be described the utilization of the tooling or fixture that has so far been described and the method whereby the purposes of the apparatus are realized.

The Delrin insert 60 fits into the cavity 22 as may be seen in FIGS. 3, 4, and 6. In the method the magnetic slider head is positioned in the opening 55 in the carrier member or button 52 as may be seen in FIGS. 2-6. The carrier member or button is positioned in the cavity 22 in the fixture 10 as illustrated in FIGS. 3-6. The magnetic slider head is in the opening 55 and its top surface extends down into the recess 62 in the insert 60. The fixture is constructed so that the bottom of the circular edges of the button 52 come flush with the top of the fixture 10 as may be seen in the figures.

The top or holding plate 70 is positioned over the top of the fixture as previously described. The leaf spring 88 and the holding pin 90 are in a position as shown so that the pin 92 engages the other side of the magnetic slider head 58 as can be seen in FIGS. 4 and 6 to hold it in position in the opening 52 and in the recess 62 in the Delrin insert 60. The parts are accurately dimensioned so that with the button 52 and the magnetic slider head in position as shown in FIGS. 4 and 6 the amount of protrusion of the magnetic slider head 58 from the top surface of the button 52 is very accurately predetermined and held while the securement between the parts is made.

With the top plate 70 in position as described epoxy is applied for bonding purposes along the edges of the magnetic slider head 58 and the opening 58 in button 52. The epoxy may be applied with a needle as illustrated in FIG. 5.

The epoxy having been applied and with the top plate 70 in position the fixture 10 and top plate are slid into or telescoped into the auxiliary fixture or device 100 so that the spring, like the spring 116 enages as the top plate 70 and hold the parts in position while the epoxy is being cured. After it is cured the fixture 10 with the top plate 70 can be removed and the assembled parts, that is, the carrier member or button 52 with the magnetic slider head bonded to it can be removed.

From the foregoing it can be observed that the button 52 and the magnetic slider head 58 become secured together with the accurately predetermined amount of protrusion of the magnetic slider head from the opening 55 in the button. This is accomplished with precision and with simplified manipulations without requiring great manual dexterity and without attempting to take measurements while assembling the parts.

From the foregoing those skilled in the art will readily understand the nature of the invention and its utilization and the manner in which all of the objects as set forth in the foregoing are realized.

The foregoing disclosure is representative of a preferred form of the invention and is to be interpreted in an illustrative rather than a limiting sense the invention to be accorded the full scope of the claims appended hereto.

We claim:

1. As an article of manufacture, fixture means for assembling a magnetic slider head in a carrier member for the magnetic slider head, the carrier member having an opening in it in a surface thereof to receive the slider head, in combination, a fixture member having a cavity in it shaped to receive the carrier member and to hold the carrier member in position in the fixture member, the fixture member having further means to engage the slider head when positioned in the opening in the carrier member whereby to predetermine the amount of protrusion of the slider member from a surface of the carrier member, and a holding means for holding the carrier member in position and for holding the magnetic slider head in position in the fixture member while the carrier member and the slider head are secured together.

2. An article as in claim 1, wherein said further means in the fixture is in the form of an insert member in the cavity of the fixture member wherein said insert member provides a recess shaped to receive and retain the magnetic slider head.

3. An article as in claim 1, wherein the means for holding the magnetic slider head includes a resilient member positioned to exert a holding pressure on the magnetic slider head.

4. An article as in claim 1, wherein the holding means includes a plate constructed to be positioned and held over the cavity in the fixture member.

5. An article as in claim 4, including retaining means for holding the said plate in position relative to the fixture member.

6. An article as in claim 5, wherein said retaining means is in the form of a retaining fixture constructed to telescopically receive the said fixture member and to resiliently retain the said plate in position.

7. A method of assembling a magnetic slider head and a carrier member for the magnetic slider head, the said carrier member having an opening shaped to receive the slider head, the steps including holding the carrier member in a fixture with the magnetic slider head positioned in the opening in the carrier member, positioning the magnetic slider head in the opening in the carrier member means providing a surface in the fixture whereby to predetermine the amount of protrusion of the magnetic slider head from the opening in the carrier member, holding the carrier member in the fixture and holding the magnetic slider head in position in the opening and against the said surface and securing the magnetic slider head to the carrier member.

8. A method as in claim 7, including the step of providing a cavity in the fixture member to receive the carrier member, providing an insert in the cavity having a surface positioned to receive a part of the magnetic slider head while in the opening in the carrier member.

9. A method as in claim 8, including applying a holding force against the magnetic slider head to hold said magnetic slider head in contact with the said surface in the fixture member.

10. A method of assembling a magnetic slider head and carrier member for the magnetic slider head, wherein the carrier member is in the form of a button having an opening shaped to receive the slider head, the steps including forming a fixture having a cavity to receive and hold the button; placing the magnetic slider head in the opening in the button and placing and holding the button in the cavity in an inverted position; positioning the magnetic slider head in the opening in the button against a predetermined surface in the fixture in a manner whereby to predetermine the amount of protrusion of the magnetic slider head from the opening in the button; holding the button in the fixture and holding the magnetic slider head in position in the opening in the button against the said predetermined surface in the fixture and securing the magnetic slider head to the button while it is held in the fixture.

11. A method as in claim 10, including the step of applying a holding force against the magnetic slider head while said magnetic slider head is in position in the opening in the button and against the said surface in the fixture.

12. A method as in claim 11, including positioning an insert in the bottom of the cavity in the fixture and providing the predetermined surface against which the magnetic slider head is positioned, on the insert.

13. A method as in claim 10, including applying bonding material to the magnetic slider head; placing a holding member over the cavity in the fixture to hold the button and magnetic slider head and allowing the bonding material to set.

* * * * *